United States Patent
Zhang et al.

(10) Patent No.: US 10,767,279 B2
(45) Date of Patent: Sep. 8, 2020

(54) METHOD OF PREPARING WEAR AND CUT RESISTANT UHMWPE FIBERS

(71) Applicant: Zhejiang Jinhao New Materials Co., Ltd., Shaoxing, Zhejiang (CN)

(72) Inventors: Jianfang Zhang, Shaoxing (CN); Xinwei Wang, Shaoxing (CN); Yongfei Sun, Shaoxing (CN); Shuiyao Liu, Shaoxing (CN); Wenlan Gong, Shaoxing (CN); Wenjun Wen, Shaoxing (CN)

(73) Assignee: ZHEJIANG JINHAO NEW MATERIALS CO., LTD., Shaoxing, Zhejiang (CN)

( * ) Notice: Subject to any disclaimer, the term of this patent is extended or adjusted under 35 U.S.C. 154(b) by 311 days.

(21) Appl. No.: 15/892,357

(22) Filed: Feb. 8, 2018

(65) Prior Publication Data

US 2018/0363168 A1    Dec. 20, 2018

(30) Foreign Application Priority Data

Jun. 20, 2017 (CN) .......................... 2017 1 0466779

(51) Int. Cl.

| D01F 1/10 | (2006.01) |
|---|---|
| D01D 1/02 | (2006.01) |
| D01D 5/06 | (2006.01) |
| D01D 5/04 | (2006.01) |
| D01F 6/04 | (2006.01) |
| D01F 6/30 | (2006.01) |
| B82Y 30/00 | (2011.01) |

(52) U.S. Cl.
CPC ................. D01F 1/10 (2013.01); D01D 1/02 (2013.01); D01D 5/04 (2013.01); D01D 5/06 (2013.01); D01F 6/04 (2013.01); D01F 6/30 (2013.01); B82Y 30/00 (2013.01); *D10B 2321/0211* (2013.01); *D10B 2401/00* (2013.01); *D10B 2501/041* (2013.01)

(58) Field of Classification Search
CPC ..... D01F 1/10; D01F 6/04; D01F 6/30; D01F 6/46; D01D 5/04; D01D 1/02; D01D 5/06; D10B 2321/0211; D10B 2401/00; D10B 2501/041; B82Y 30/00

See application file for complete search history.

(56) References Cited

U.S. PATENT DOCUMENTS

| 5,342,567 A  * |  8/1994 | Chen ....................... | B82Y 30/00 264/203 |
|---|---|---|---|
| 7,423,084 B2 * |  9/2008 | Marissen ................. | C08K 7/24 524/495 |
| 7,652,084 B2 * |  1/2010 | Chu ........................ | B82Y 10/00 252/301.35 |
| 7,780,888 B2 * |  8/2010 | van der Werff ........ | B82Y 30/00 264/184 |
| 7,897,248 B2 * |  3/2011 | Barrera .................. | B82Y 30/00 428/295.4 |
| 8,052,905 B2 * | 11/2011 | Da Cunha .............. | D01D 13/00 264/103 |
| 9,915,012 B2 * |  3/2018 | Satpathy ................. | C08J 3/075 |
| 9,957,643 B2 * |  5/2018 | Simmelink .............. | D01D 5/04 |
| 10,190,236 B2 * |  1/2019 | Satpathy ................. | D01D 10/06 |
| 2005/0089677 A1* |  4/2005 | Marissen ................. | C08K 7/24 428/299.1 |
| 2006/0047052 A1* |  3/2006 | Barrera .................. | B82Y 30/00 524/495 |
| 2008/0044654 A1* |  2/2008 | Cadoret ................. | B82Y 30/00 428/394 |
| 2011/0082262 A1* |  4/2011 | Yeh ........................ | B82Y 30/00 525/333.7 |
| 2011/0268962 A1* | 11/2011 | Rastogi ................... | C08K 3/01 428/325 |
| 2015/0050858 A1* |  2/2015 | Saxena .................. | C09K 21/14 442/302 |
| 2017/0058431 A1* |  3/2017 | Shen ...................... | D02G 3/442 |
| 2020/0024773 A1* |  1/2020 | Vlasblom ............... | D01D 1/02 |

* cited by examiner

*Primary Examiner* — Jeffrey M Wollschlager
(74) *Attorney, Agent, or Firm* — Leong C. Lei

(57) ABSTRACT

The present invention relates to a method of preparing wear and cut resistant UHMWPE fibers. In the method, a resin material is added into a ball grinder, and the temperature is controlled, and then a mother liquor is added slowly into the ball grinder and mixed uniformly, and the mixed solution is vacuumed in a sealed container for several hours and extruded by a twin screw extruder, a metering pump, and a spin beam, and finally processed with drafting and hot drawing and winding formation. The fiber so manufactured has the features of soft touch and comfortable wearing.

7 Claims, No Drawings

METHOD OF PREPARING WEAR AND CUT RESISTANT UHMWPE FIBERS

BACKGROUND OF THE INVENTION

1. Field of the Invention

The present invention relates to the field of polymer compound modification, in particular to a method of preparing wear and cut resistant UHMWPE fibers which comes with a soft texture for comfortable wearing.

2. Description of the Related Art

Ultra High Molecular Weight Polyethylene (UHMWPE) fibers UHMWPE (UHMWPE) fiber is the strongest fiber among the industrial fiber materials, and one of the highly wear and chemical corrosion resistant materials used extensively in different areas such as national defense, military, marine cables, individual protection, etc. As the military-to-civil market continues growing, the UHMWPE fibers are used extensively in the civil market, and cut resistant gloves gradually gain the leading position in the civil market. At present, protective gloves made of common 400 D UHMWPE fibers have a wear resistant EN388-2003 standard of Level 3, and a cut resistant EN388-2003 standard of Level 3, and these protective gloves no longer meet the protection requirements for cut injuries in actual working environments.

To improve the wear and cut resistance coefficient of the gloves, steel wires or fiberglass and UHMWPE fiber are usually mixed in the weaving. In a preparation method of cut resistant gloves as disclosed in P.R.C. Pat. No. 201410433603.0, the cut resistant gloves are formed by inner and outer layers, and the inner layer is made of woven cotton, yarn, and aramid fiber, and the outer layer is made of fine steel wires. A process of covering a cut resistant labor protecting gloves with a woven material as disclosed in P.R.C. Pat. No. 201410595335.2 uses 100 D fiberglass as the core, and a one-way low stretch yarn is used for covering the outer side of the gloves, adopts a double weaving method to produce the labor protection gloves. Although this method can improve the wear and cut resistance coefficient of the gloves significantly, the steel wire is relatively hard, and may be broken very easily when it is exposed from the fiberglass. Furthermore, the gloves are hard, so that the wearers may have a secondary injury such as itching, allergy, or cut injury. The operational flexibility and contact feeling are dropped greatly when wearing such grooves, and thus the protection function and the comfortable wearing cannot coexist.

An UHMWPE composite and a highly wear and cut resistant fiber prepared by the UHMWPE composite as disclosed in P.R.C. Pat. No. 201610586289.9 adds silicone carbide and modified graphene into an UHMWPE resin to enhance the wear and cut resistant functions of the fiber. A cut resistant UHMWPE fiber and its preparation process as disclosed in P.R.C. Pat. No. 201610515744.6 is formed by UHMWPE, expandable organic silicate clay, modified graphene, anti-oxidant, and the additive such as graphene used in the process is not just high priced only, but the produced fibers have a dark color which cannot be mixed other color fibers easily, and such produced fibers are limited by its cost and appearance. In addition, the product has a too-high hardness, so that during subsequent processes such as the manufacture of cut resistant gloves, the gloves weaving machines may be damaged easily, and the adhesive (layer) cannot be controlled easily. As a result, the yield rate is low, and the comfort of wearing is poor.

A cut resistant composite yarn as disclosed in P.R.C. Pat. No. 201080007173.6 mentioned the addition of a hard staple fiber into the fiber covering, but has not disclosed the types and conditions of the hard staple fiber, the manufacture of the fiber, and the method of adding the hard staple fiber. The present invention enhances the wear and cut resistant functions of UHMWPE fibers by modified additives, and the invention not just has the features of simple operation and low cost only, but also produces fibers of different specifications and appearances, and thus the invention is applicable for a large-scale industrial production, and the cut resistant gloves so manufactured provide soft and comfortable wearing.

SUMMARY OF THE INVENTION

Therefore, it is a primary objective of the present invention to overcome the drawbacks of the prior art by providing a method of preparing wear and cut resistant UHMWPE fibers with a simple production process applicable for a large-scale industrial production, and the features of soft touch, excellent cut resistance, and preventing secondary injury.

To achieve the aforementioned and other objectives, the present invention provides a method of preparing wear and cut resistant UHMWPE fibers, comprising the preparation of a mother liquor and a resin material, wherein the mother liquor is prepared by adding 0.1~5 parts of coupling agent A, 1~20 parts of nano additive B, 1~20 parts of additive C, 0.1~5 parts of sodium stearate, 0.1~8 parts of nano dispersant, and 0.110 parts of antioxidant into 1000 parts of solvent oil, and processed by a 1000~20000 r/min high-speed rotating emulsifier for 2~6 hours, and a mixing temperature being controlled at 25~100° C.; and the resin material is an UHMWPE resin with a viscosity-average molecular weight of 200~8 millions, and 20~200 parts of the resin material are added into a ball grinder, and the temperature is controlled at 30~100° C., and then the mother liquor is added into the ball grinder at a speed of 2 parts/minute, and blended and mixed uniformly, and then the mixed solution is vacuumed in a sealed container for 2~6 hours, and then extruded by a twin screw extruder, a metering pump, a spin beam, and processed by drafting, and hot drawing and winding formation.

Further, the solvent oil includes but not limited to one or two mixtures selected from the group consisting of a white oil, a vegetable oil, an animal oil, decalin, tetrahydronaphthalene, xylene (including o-xylene, m-xylene, and p-xylene), and toluene.

Further, the coupling agent A includes one or two mixtures selected from the group consisting of a silane coupling agent KH550, KH560, KH570; a titanate coupling agent NDZ101, NDZ201; a phosphate coupling agent, a zirconate coupling agent, a borate coupling agent.

Further, the nano additive B includes one or two mixtures selected from the group consisting of SiO2, TiO2, Al2O3, MgO, CaO, Si3N4, ZrO2, CrO3, montmorillonite, nano carbon black, graphite, tin antimony oxide, and carbon nanotube.

Further, the nano additive B has a size of 10 nm~400 nm, preferably 40~100 nm.

Further, the additive C includes one or more mixtures selected from the group consisting of a basalt staple fiber, a rockwool staple fiber, a slag cotton staple fiber, a glass staple fiber, an aluminum silicate cotton staple fiber, a polyester staple fiber, a carbon staple fiber, and an aramid staple fiber.

Further, the additive C has a length of 1 μm~500 μm, preferably 30 μm~150 μm, and a diameter of 1~100 μm, preferably 5~20 μm.

Further, the antioxidant includes but not limited to one or more mixtures selected from the group consisting of tetra [β-(3,5-di-tert-butyl-4-hydroxyphenyl)-propionate], tris(2,4-di-tert-butylphenyl) phosphite, and β-(3,5-di-tert-butyl-4-hydroxyphenyl) propionate.

Further, the nano dispersant includes but not limited to one or more mixtures selected from the group consisting of a commercially available nano dispersant VK-01, a commercially available nano dispersant TAZ-ND1, and a commercially available nano dispersant TAZ-CNT.

Further, the UHMWPE the UHMWPE has a molecular weight of 2 millions~8 millions, preferably 4 millions~6.5 millions; and the resin has an average particle size of 100~300 μm, a particle size distribution width of (d90–d10)/d50: 0.7~1.8, and a bulk density of 0.3~0.5 g/cm3.

Compared with the prior art, the present invention has the following advantages and effects:

The wear and cut resistant UHMWPE fiber of the present invention is usually mixed and woven with steel wire or fiberglass to enhance the wear and cut resistant functions of the fiber. Compared with the method of adding a high priced material such as graphene to enhance the wear and cut resistant functions of the fiber, the present invention processes the inorganic nano materials and staple fibers to enhance the wear and cut resistant functions of the UEMWPE fibers. The invention has the features of simple operation and low cost, and is applicable for a large-scale industrial production.

BRIEF DESCRIPTION OF THE DRAWINGS

Nil

DESCRIPTION OF THE PREFERRED EMBODIMENTS

The above and other objects, features and advantages of this disclosure will become apparent from the following detailed description taken with the accompanying drawings.

Embodiment 1

In a method of preparing wear and cut resistant UHMWPE fibers in accordance with the first embodiment of the present invention, 0.5 part of silane KH550 coupling agent, 5 parts of nano silicon dioxide with a size of 40 nm, 6 parts of basalt staple fiber with a length of 80 μm and a diameter of 6 μm, 0.2 part of sodium stearate, 0.2 part of tetra [β-(3,5-di-tert-butyl-4-hydroxyphenyl)-propionate], 0.8 part of nano dispersant VK-01 are added into 1000 parts of a white oil, and the mixture is processed by a 8000 r/min high-speed rotating emulsifier at a temperature of 60° C. for 4 hours. 80 parts of a resin material (2) with a molecular weight of 4 millions, an average particle size of 180 μm, a particle size distribution width of (d90–d10)/d50: 1.2, and a bulk density 0.34 g/cm3 are added into a ball grinder, and the temperature is controlled at 50° C., and then the mother liquor (1) is added into the ball grinder slowly at a speed of 2 parts/minute, and blended and mixed uniformly, and then the mixed solution is vacuumed in a sealed container for 4 hours and then processed by a wet spinning process and extruded by a twin screw extruder, a metering pump, and a spin beam, and then processed with extraction, drying, drafting and hot drawing and winding formation. The fibers so manufactured are tested, and the testing results show that the fibers have a fineness of 400 D, a breaking strength of 28.6 cN/dtex, a modulus of 1546 cN/dtex, and elongation at break of 2.6%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 2

In a method of preparing wear and cut resistant UHMWPE fibers in accordance with the second embodiment of the present invention, 0.5 part of titanate coupling agent NDZ101, 5 parts of nano silicon dioxide with a size of 40 nm, 6 parts of aluminum silicate cotton staple fiber with a length of 80 μm and a diameter of 6 μm, 0.2 part of sodium stearate, 0.5 part of tris(2,4-di-tert-butylphenyl) phosphite, 1 part of nano dispersant VK-01 are added into 1000 parts of decalin, and the mixture is processed by a 8000 r/min high-speed rotating emulsifier at a temperature of 60° C. for 4 hours. 80 parts of a resin material (2) with a molecular weight of 6 millions, an average particle size of 200 μm, a particle size distribution width of (d90–d10)/d50: 1.5, and a bulk density 0.34 g/cm3 are added into a ball grinder, and the temperature is controlled at 50° C., and then the mother liquor (1) is added into the ball grinder slowly at a speed of 2 parts/minute, and blended and mixed uniformly, and then the mixed solution is vacuumed in a sealed container for 2 hours, and then processed by a dry spinning process and extruded by a twin screw extruder, a metering pump, and a spin beam, and blown sideway by air, and the solvent is evaporated in the passage, and then processed with drafting and hot drawing and winding formation. The fibers so manufactured are tested, and the test results show that the fiber has a fineness of 400 D, a breaking strength of 26.3 cN/dtex, a modulus of 1804 cN/dtex, an elongation at break of 2.4%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 3

In a method of preparing wear and cut resistant UHMWPE fibers in accordance with the third embodiment of the present invention, 1 part of titanate coupling agent, 5 parts of nano titanium dioxide with a size of 40 nm, 6 parts of glass staple fiber with a length of 80 μm and a diameter of 6 μm, 0.2 part of sodium stearate, 0.2 part of tetra [β-(3,5-di-tert-butyl-4-hydroxyphenyl)-propionate], 0.8 part of nano dispersant VK-01 are added into 1000 parts of vegetable oil, and the mixture is processed by a 5000 r/min high-speed rotating emulsifier at a temperature of 60° C. for 4 hours. 80 parts of a resin material (2) with a molecular weight of 4 millions, an average particle size of 180 μm, a particle size distribution width of (d90–d10)/d50: 1.2, and a bulk density 0.34 g/cm3 are added into a ball grinder, and the temperature is controlled at 50° C., and then the mother liquor (1) is added into the ball grinder slowly at a speed of 2 parts/minute, and blended and mixed uniformly, and then the mixed solution is vacuumed in a sealed container for 4 hours, and then processed by a wet spinning process and extruded by a twin screw extruder, a metering pump, and a spin beam, and processed with extraction, drying, drafting and hot drawing and winding formation. The fibers so manufactured are tested, and the test results show that the fiber has a fineness of 400 D, a breaking strength of 27.1 cN/dtex, a modulus of 1421 cN/dtex, an elongation at break of 2.6%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 4

In a method of preparing wear and cut resistant UHM-WPE fibers in accordance with the fourth embodiment of the present invention, 2 parts of phosphate coupling agent, 5 parts of nano $Al_2O_3$ with a size of 40 nm, 6 parts of glass staple fiber with a length of 80 μm and a diameter of 6 μm, 0.2 part of sodium stearate, 0.2 part of tetra [β-(3,5-di-tert-butyl-4-hydroxyphenyl)-propionate], 0.8 part of nano dispersant VK-01 are added into 1000 parts of animal oil, and the mixture is processed by a 8000 r/min high-speed rotating emulsifier at a temperature of 80° C. for 4 hours. 80 parts of a resin material (2) with a molecular weight of 4 millions, an average particle size of 160 μm, a particle size distribution width of (d90−d10)/d50: 1.5, and a bulk density 0.34 g/cm3 are added into a ball grinder, and the temperature is controlled at 60° C., and then the mother liquor (1) is added into the ball grinder slowly at a speed of 2 parts/minute, and blended and mixed uniformly, and then the mixed solution is vacuumed in a sealed container for 4 hours, and then processed by a wet spinning process and extruded by a twin screw extruder, a metering pump, and a spin beam, and processed with extraction, drying, drafting and hot drawing and winding formation. The fibers so manufactured are tested, and the test results show that the fiber has a fineness of 200 D, a breaking strength of 31.8 cN/dtex, a modulus of 1512 cN/dtex, an elongation at break of 2.3%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 5

In a method of preparing wear and cut resistant UHM-WPE fibers in accordance with the fifth embodiment of the present invention, 0.2 part of zirconate coupling agent, 2 parts of CrO3 with a size of 50 nm, 6 parts of basalt staple fiber with a length of 80 μm and a diameter of 6 μm, 0.2 part of sodium stearate, 0.5 part of tris(2,4-di-tert-butylphenyl) phosphite, 1 part of nano dispersant VK-01 are added into 1000 parts of tetrahydronaphthalene, and the mixture is processed by a 8000 r/min high-speed rotating emulsifier at a temperature of 60° C. for 4 hours. 80 parts of a resin material (2) with a molecular weight of 4 millions, an average particle size of 180 μm, a particle size distribution width of (d90−d10)/d50: 1.0, and a bulk density 0.34 g/cm3 are added into a ball grinder, and the temperature is controlled at 50° C., and then the mother liquor (1) is added into the ball grinder slowly at a speed of 2 parts/minute, and blended and mixed uniformly, and then the mixed solution is vacuumed in a sealed container for 2 hours, and then processed by a dry spinning process and extruded by a twin screw extruder, a metering pump, and a spin beam, and blown sideway by air, and the solvent is evaporated in the passage, and then processed with drafting and hot drawing and winding formation. The fibers so manufactured are tested, and the test results show that the fiber has a fineness of 100 D, a breaking strength of 35.0 cN/dtex, a modulus of 1632 cN/dtex, an elongation at break of 2.1%, and the cut resistant gloves made of such fiber are soft, and the EN388-2003 surface characteristics test shows that the wear resistance reaches the level of 4, and the cut resistance reaches the level of 4. The American Standard Testing Manual (ASTM) F1790-9704 test shows that the cut resistance reaches a level of 3.

Embodiment 6

In a method of preparing wear and cut resistant UHM-WPE fibers in accordance with the sixth embodiment of the present invention, 3 parts of borate coupling agent, 3 parts of carbon nanotube with a size of 20 nm, 10 parts of glass staple fiber with a length of 100 μm and a diameter of 10 μm, 0.2 part of sodium stearate, 0.5 part of β-(3,5-di-tert-butyl-4-hydroxyphenyl) propionate, 0.8 part of a commercially available nano dispersant TAZ-CNT are added into 1000 parts of animal oil, and the mixture is processed by a 8000 r/min high-speed rotating emulsifier at a temperature of 80° C. for 4 hours. 80 parts of a resin material (2) with a molecular weight of 4 millions, an average particle size of 180 μm, a particle size distribution width of (d90−d10)/d50: 1.2, and a bulk density 0.34 g/cm3 are added into a ball grinder, and the temperature is controlled at 60° C., and then the mother liquor (1) is added into the ball grinder slowly at a speed of 2 parts/minute, and blended and mixed uniformly, and then the mixed solution is vacuumed in a sealed container for 4 hours, and then processed by a wet spinning process and extruded by a twin screw extruder, a metering pump, and a spin beam, and then processed with extraction, drying, drafting and hot drawing and winding formation. The fibers so manufactured are tested, and the test results show that the fiber has a fineness of 400 D, a breaking strength of 34.5 cN/dtex, a modulus of 1721 cN/dtex, an elongation at break of 2.1%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 7

In a method of preparing wear and cut resistant UHM-WPE fibers in accordance with the seventh embodiment of the present invention, 3 parts of silane coupling agent KH570, 3 parts of carbon nanotube with a size of 20 nm, 10 parts of glass staple fiber with a length of 100 μm and a diameter of 10 μm, 0.2 part of sodium stearate, 0.5 part of β-(3,5-di-tert-butyl-4-hydroxyphenyl) propionate, 0.8 of a commercially available nano dispersant TAZ-CNT are added into 1000 parts of animal oil, and the mixture is processed by a 8000 r/min high-speed rotating emulsifier at a temperature of 80° C. for 4 hours. 80 parts of a resin material (2) with a molecular weight of 6 millions, an average particle size of 180 μm, a particle size distribution width of (d90−d10)/d50: 1.5, and a bulk density 0.4 g/cm3 are added into a ball grinder, and the temperature is controlled at 60° C., and then the mother liquor (1) is added into the ball grinder slowly at a speed of 2 parts/minute, and blended and mixed uniformly, and then the mixed solution is vacuumed in a sealed container for 6 hours, and then processed by a dry spinning process and extruded by a twin screw extruder, a metering pump, and a spin beam, and blown sideway by air, and the solvent is evaporated in the passage, and then processed with drafting and hot drawing winding formation. The fibers so manufactured are tested, and the test results show that the fiber has a fineness of 200 D, a breaking strength of 33.6 cN/dtex, a modulus of 1685 cN/dtex, an elongation at break of 2.3%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 8

This embodiment is substantially the same as Embodiment 1, except that the modified additive B is a mixture of SiO2 and TiO2 mixed in a ratio of 1:1. The fibers so manufactured are tested, and the test results show that the fiber has a fineness of 400 D, a breaking strength of 25.6 cN/dtex, a modulus of 1425 cN/dtex, an elongation at break of 2.6%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 9

This embodiment is substantially the same as Embodiment 1, except that the modified additive B is a mixture of carbon nanotube and graphite mixed in a ratio of 2:1.

The fibers so manufactured are tested, and the test results show that the fiber has a fineness of 200 D, a breaking strength of 25.1 cN/dtex, a modulus of 1221 cN/dtex, an elongation at break of 2.5%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 10

This embodiment is substantially the same as Embodiment 2, except that the modified additive B is a mixture of Al2O3 and Si3N4 mixed in a ratio of 1:1.

The fibers so manufactured are tested, and the test results show that the fiber has a fineness of 400 D, a breaking strength of 28.1 cN/dtex, a modulus of 1621 cN/dtex, an elongation at break of 2.6%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

Embodiment 11

This embodiment is substantially the same as Embodiment 2, except that the modified additive B is a mixture of montmorillonite and MgO mixed in a ratio of 2:1. The fibers so manufactured are tested, and the test results show that the fiber has a fineness of 200 D, a breaking strength of 29.2 cN/dtex, a modulus of 1431 cN/dtex, an elongation at break of 2.5%, and the cut resistant gloves made of such fiber are soft, and the EN388-2003 surface characteristics test shows that the wear resistance reaches the level of 4, and the cut resistance reaches the level of 5. The American Standard Testing Manual (ASTM) F1790-9704 test shows that the cut resistance reaches a level of 3.

What is claimed is:

1. A method of preparing wear and cut resistant UHMWPE fibers, comprising steps of:
    preparing a mother liquor by adding 0.1-0.5 parts of coupling agent A, 1-20 parts of nano additive B, 1-20 parts of additive C, 0.1-5 parts of sodium stearate, 0.1-8 parts of nano-sized dispersant, and 0.1-10 parts of antioxidant into 1000 parts of solvent oil, and processed by a 1000-20000 r/min high-speed rotating emulsifier for 2-6 hours, and a mixing temperature being controlled at 25° C.-100° C., wherein the nano additive B is selected from the group consisting of SiO2, TiO2, Al2O3, MgO, CaO, Si3N4, ZrO2, CrO3, montmorillonite, nano carbon black, graphite, tin antimony oxide, and carbon nanotube, and wherein the additive C is selected from the group consisting of a basalt staple fiber, a rockwool staple fiber, a slag cotton staple fiber, a glass staple fiber, an aluminum silicate cotton staple fiber, a polyester staple fiber, a carbon staple fiber, and an aramid staple fiber;
    preparing a resin material which is an UHMWPE resin with a viscosity-average molecular weight of 2 millions-8 millions, adding 20-200 parts of the resin material into a ball grinder at a temperature controlled at 30° C.-100° C.;
    adding the mother liquor into the ball grinder at a speed of 2 parts/minute;
    blending and mixing the mother liquor and the resin material uniformly to form a mixed solution;
    vacuuming the mixed solution in a sealed container for 2-6 hours; and
    the mixed solution being extruded in sequence by a twin screw extruder, a metering pump, a spin beam, and processed by drafting, and drawing and winding formation.

2. The method of preparing wear and cut resistant UHMWPE fibers according to claim 1, wherein the solvent oil is selected from the group consisting of a white oil, a vegetable oil, an animal oil, decalin, tetrahydronaphthalene, xylene, and toluene.

3. The method of preparing wear and cut resistant UHMWPE fibers according to claim 1, wherein the coupling agent A is selected from the group consisting of a silane coupling agent, a titanate coupling agent, a phosphate coupling agent, a zirconate coupling agent, and a borate coupling agent.

4. The method of preparing wear and cut resistant UHMWPE fibers according to claim 1, wherein the nano additive B has a size of 10 nm-400 nm.

5. The method of preparing wear and cut resistant UHMWPE fibers according to claim 1, wherein the additive C has a length of 1 μm-500 μm, and a diameter of 1-100 μm.

6. The method of preparing wear and cut resistant UHMWPE fibers according to claim 1, wherein the antioxidant is selected from the group consisting of tetra [β-(3,5-di-tert-butyl-4-hydroxyphenyl)-propionate], tris(2,4-di-tert-butylphenyl) phosphite, and β-(3,5-di-tert-butyl-4-hydroxyphenyl)propionate.

7. The method of preparing wear and cut resistant UHMWPE fibers according to claim 1, wherein the UHMWPE has a molecular weight of 4 millions-6.5 millions; the resin has an average particle size of 100-300 μm, a particle size distribution width of (d90–d10)/d50: 0.7-1.8, and a bulk density of 0.3-0.5 g/cm3.

\* \* \* \* \*